United States Patent [19]

Nagashima

[11] Patent Number: 5,222,913
[45] Date of Patent: Jun. 29, 1993

[54] RESILIENT CONNECTOR FOR STEERING SHAFT

[75] Inventor: Toshiyuki Nagashima, Maebashi, Japan

[73] Assignee: Nippon Seiko Kabushiki Kaisha, Tokyo, Japan

[21] Appl. No.: 938,528

[22] Filed: Sep. 2, 1992

Related U.S. Application Data

[63] Continuation of Ser. No. 524,380, May 17, 1990, abandoned.

[30] Foreign Application Priority Data

May 30, 1989 [JP] Japan .................. 1-134646

[51] Int. Cl.⁵ .................. B62D 1/19; F16D 3/78
[52] U.S. Cl. .................. 464/93; 74/492; 280/777; 464/162
[58] Field of Search .................. 464/87, 88, 91–93, 464/136, 160, 162, 180; 74/492; 280/775, 777, 780

[56] References Cited

U.S. PATENT DOCUMENTS

| | | | |
|---|---|---|---|
| 3,543,538 | 5/1969 | Farrell et al. | 464/93 |
| 4,183,258 | 1/1980 | Stephan | 464/89 X |
| 4,572,022 | 2/1986 | Mettler | 74/492 |
| 4,667,530 | 5/1987 | Mettler et al. | 464/162 X |
| 4,693,136 | 9/1987 | Clerc et al. | 74/492 |
| 4,702,722 | 10/1987 | Narue et al. | 464/93 |
| 4,983,143 | 1/1991 | Sekine et al. | 464/160 X |

FOREIGN PATENT DOCUMENTS

| | | | |
|---|---|---|---|
| 392858 | 10/1990 | European Pat. Off. | 280/777 |
| 57-69117 | 4/1982 | Japan | 464/87 |
| 61-191528 | 11/1986 | Japan . | |

Primary Examiner—Daniel P. Stodola
Assistant Examiner—William G. Battista, Jr.
Attorney, Agent, or Firm—Shapiro and Shapiro

[57] ABSTRACT

A resilient connector for a steering shaft connecting a wheel steering system and a steering handle, comprises a flange member connected to a first shaft member extending from the wheel steering system, particularly in such a manner that it can be shifted axially but not rotated with respect to the first shaft member; a yoke member connected through a universal joint to a second shaft member extending from the steering handle; a resilient member arranged between the flange member and the yoke member; a first connecting member for connecting the flange member to the resilient member; and a second connecting member for connecting the yoke member to the resilient member. Vibration from the wheel steering system is prevented from being transmitted to the steering handle by the resilient member, and the resilient member permits an axial movement of the first shaft member during a collision.

10 Claims, 2 Drawing Sheets

RESILIENT CONNECTOR FOR STEERING SHAFT

This is a continuation of application Ser. No. 524,380 filed May 17, 1990, now abandoned.

BACKGROUND OF THE INVENTION

1. Field of the Invention

The present invention relates to a resilient connector for a steering shaft. Such a resilient connector is attached to an end of a steering shaft of an automobile vehicle for preventing the transmission of vibration applied to steering vehicle wheels to a steering handle. The connector is also adapted to absorb shock in order to ensure the driver's safety if a collision of the vehicle occurs.

2. Related Background Art

In a steering system for an automobile vehicle, the movement of a steering handle is transmitted to a steering gear through a steering shaft to provide a steering angle at steering vehicle wheels (normally, front wheels). In such a steering system, generally, since a transmission mechanism for transmitting the steering force from the steering handle to the steering gear is constructed mechanically, if the vehicle is running on a rough surface, the vibration applied to the steering wheels will be transmitted to the steering handle through the steering gear and the steering shaft. If the vibration is transmitted up to the steering handle, the driver feels uncomfortable for driving or steering the vehicle.

It is known that by providing a resilient connector at an end of the steering shaft to absorb such vibration, the vibration of the steering wheels may be prevented from being transmitted up to the steering handle. An example of such an arrangement is disclosed in Japanese Utility Model Laid-Open No. 61-191528 and is shown in FIGS. 3 and 4. In FIGS. 3 and 4, the reference numeral 51 denotes a flange fixed to an end of a shaft 52 which is connected to a steering gear. The reference numeral 53 denotes a coupling member made of elastic or resilient material such as rubber and the like. A resilient coupling is constructed to absorb vibration by the elasticity of the coupling member 53. The reference numeral 54 denotes a yoke opposed to the flange 51 with the interposition of the coupling member 53, which yoke 54 can be connected to the end of a steering shaft (not shown) through a universal joint (not shown).

The flange 51 and the coupling member 53 are connected to each other by first bolts 56 and first nuts 57 situated in diametrically opposed positions, and by a first connecting means comprising a first circular hold-down plate 58 having arcuate notches 71 cut therein in diametrically opposed positions. More particularly, the first bolts 56 passed through openings 59 formed in both end portions of the flange 51 pass through a pair of diametrically opposed through holes 60 among four through holes 60, 61 formed in the coupling member 53 equidistantly, and then pass through openings 62 formed in both end portions of the first hold-down plate 58, and thereafter threadedly receive the first nuts 57 thereon, respectively, whereby the flange 51 and the coupling member 53 are fastened to each other.

In addition, the yoke 54 and the coupling member 53 are connected to each other by second bolts 63 and second nuts 64 situated in diametrically opposed positions, and by a second connecting means comprising a second hold-down plate 65 like the above-mentioned first hold-down plate 58. More particularly, the second bolts 63 passed through openings 66 formed in both end portions of the base end of the yoke 54 pass through the remaining pair of diametrically opposed through holes 61, and then pass through openings 67 formed in both end portions of the second hold-down plate 65, and thereafter threadedly receive the second nuts 64 thereon, respectively, whereby the yoke 54 and the coupling member 53 are fastened to each other.

As a result, as shown in FIG. 4, the flange 51 fixed to the end of the shaft 52 and the yoke 54 are connected to each other through the coupling member 53 of elastic material. When the yoke 54 is rotated on the axis of shaft 52 through the universal joint and the steering shaft (both not shown) by rotating the steering handle (not shown), the rotational force is transmitted to the flange 51 through the coupling member 53, thus rotating the shaft 52 fixed to the flange 51.

Since the coupling member 53 is made of elastic material such as rubber and the like, if the angular displacement (rotation angle) of the yoke 54 is small, such angular displacement will be absorbed by the elastic deformation of the coupling member 53, thus preventing the rotational movement from being transmitted to the flange 51 (the angular displacement to be absorbed affords a "play" normally provided in the steering system). Also, if the vibration from the steering wheels is transmitted to the shaft 52, the coupling member 53 will absorb such vibration, thus preventing the yoke connected to the steering shaft from vibrating.

As is further shown in FIGS. 3 and 4, first sleeves 68 through which the first bolts 56 also pass are engaged by second notches 69 formed in the second hold-down plate 65, and second sleeves 70 through which the second bolts 63 also pass are engaged by first notches 71 formed in the first hold-down plate 58. Therefore, the displacements of the flange 51 and yoke 54 in the rotating direction are limited within ranges in which the respective sleeves 68, 70 can be shifted in the corresponding notches 69, 71. Accordingly, the coupling member 53 is not damaged or destroyed since it is not excessively deformed.

In addition to the above discussed problem of vibration transmission, steering systems also present a problem with respect to safety during a collision. In particular, if the front part of the vehicle is crushed in a collision, the rear end of the steering shaft will protrude rearwardly toward the passenger compartment of the vehicle.

Thus, in order to prevent the driver from being struck by the protruding steering shaft (secondary collision), it is desirable to design the steering system such that the shaft may collapse when subjected to the collision force or shock. For this purpose, it has been known to use a non-elastic collapsible joint or coupling at the connection portion between the end of the steering shaft and another part such as the steering gear.

A non-elastic collapsible coupling, however, cannot avoid the aforementioned problem of vibration transmission. Conversely, a conventional elastic coupling, while avoiding the problem of vibration transmission, offers little or no collapsibility and is therefore inadequate from the point of view of driver safety.

SUMMARY OF THE INVENTION

It is thus an object of the present invention to provide an improved resilient connector for a steering shaft which not only can prevent the vibration of the steering wheels from being transmitted through the steering shaft, but which also has the capability to absorb a large displacement of the steering shaft upon a collision of the vehicle at high speed.

In order to achieve the above object; according to the present invention, a resilient connector connecting a wheel steering system to a steering handle may comprise a first shaft member extending from the wheel steering system; a flange member connected to the first shaft member in such a manner that it can be shifted axially but not rotated with respect to the first shaft member; a yoke member connected through a universal joint to a second shaft member extending from a steering handle; a resilient member arranged between the flange member and the yoke member; a first connecting member for connecting the flange member to the resilient member; and a second connecting member for connecting the yoke member to the resilient member. The design is such that vibration from the wheel steering system is prevented from being transmitted to the steering handle by means of the resilient member and such that the resilient member permits an axial movement of the shaft member during a collision.

In this way, it is possible to absorb a greater displacement amount of the steering shaft during a collision and at the same time to prevent the vibration of the wheel steering system from being transmitted to the steering handle during normal driving.

BRIEF DESCRIPTION OF THE DRAWINGS

FIG. 1 shows a normal condition and FIG. 2 shows a condition that a length of the connector is shortened or collapsed upon application of shock; FIG. 3 is an exploded perspective view and FIG. 4 is a perspective view of an assembled connector.

DETAILED DESCRIPTION OF THE PREFERRED EMBODIMENT

Figure 1:
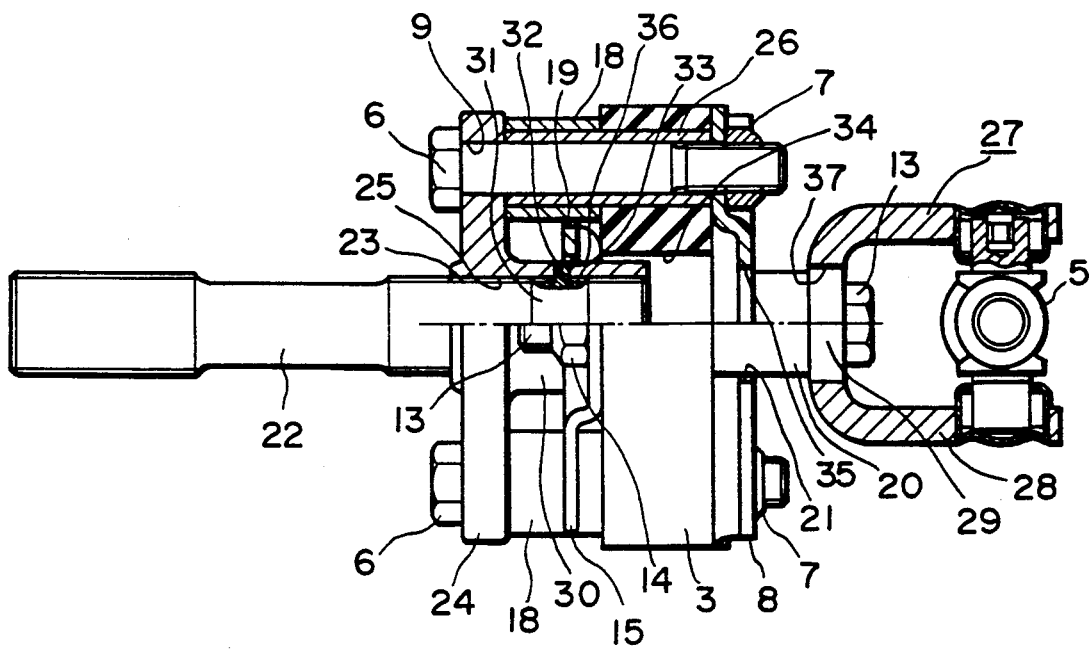
FIGS. 1 and 2 are sectional views showing a resilient connector for a steering shaft according to a preferred embodiment of the present invention, where

The present invention will now be fully explained with reference to the embodiment of FIGS. 1 and 2.

In the illustrative embodiment, a shaft 22 connected to an input shaft or the like of a steering gear through a coupling (not shown) has a serration 23 formed at one end. The serration 23 is engaged by a serration opening (groove) 25 formed in an inner surface of a cylindrical portion 30 constituting a central portion of a flange 24. Thus, the shaft 22 cannot be rotated with respect to the flange 24, whereby it is possible to transmit a rotation force from the shaft 22 to the flange 24.

A space defined between a concave portion 31 formed in the shaft 22 and an inner surface of the cylindrical portion 30 is filled with synthetic resin material to form a ring member 33. The resin material is supplied via a small hole 32 of the cylindrical portion 30 by which the shaft 22 and the flange 24 are connected to each other without play. The main portion of ring member 33 can be easily broken from a radial portion of the ring member in hole 32 when the shaft 22 is subject to an axial impact force having more than a predetermined value, thus permitting the axial displacement of the shaft 22 with respect to the flange 24.

A coupling member 3 made of elastic or resilient material such as rubber has a shape of a thick disc and is connected to the flange 24 by first bolts 6 passing through openings 9 formed in both end portions of the flange 24, a first hold-down plate 8 contacted with one face of the coupling member 3, first nuts 7 and sleeves 26, 18. Between the flange 24 and the first hold-down plate 8, a sleeve 26 is inserted around an intermediate portion of each first bolt 6, thereby maintaining a distance between the flange 24 and the hold-down plate 8. Also, between the flange 24 and the coupling member 3, a first sleeve 18 is inserted around the left half of each sleeve 26, thus maintaining a given distance between the flange 24 and the coupling member 3.

A yoke 27 opposed to the flange 24 with the interposition of the coupling member 3 has first and second bifurcated portions 28, 29 situated at its opposite axial ends. By providing a universal joint 5 arranged at the bifurcated portion 29 situated at an outer side (right side in FIGS. 1 and 2) of the resilient connector, the yoke can be connected to the end of the steering shaft (not shown).

The second bifurcated portion 29 formed on the inner end of the yoke 27 is connected to the coupling member 3 by second bolts 13 which pass through openings formed in the second bifurcated portion, sleeves 20, second hold-down plate 15 (which is in contact with the other end surface of the coupling member 3—and second nuts 14.

Further, a through hole 34 is formed in a central portion of the coupling member 3, into which the central cylindrical portion 30 of the flange 24 is inserted. In addition, through holes 35, 36, 37 are formed in central portions of the first hold-down plate 8, second hold-down plate 15 and yoke 27, respectively, thus permitting movement of the shaft 22 through these elements 8, 15, 27 to the rear (right in FIGS. 1 and 2). Normally, the cylindrical portion 30 is inserted into the central hole 36 of the second hold-down plate 15.

The operation of the illustrative embodiment for transmitting the rotational force from the steering shaft to another element, such as a steering gear, and for preventing the transmission of the vibration of the steering wheels to the steering shaft will now be explained.

When the yoke 27 is rotated on its central axis through the universal joint 5, the rotation of the yoke is transmitted to the flange 24 through the coupling member 3, with the result that the shaft 22 is rotated in the same direction through the serration connection.

Since the coupling member 3 is made of resilient material such as rubber, when vibration is transmitted from the steering wheels to the shaft 22, the coupling member 3 absorbs the vibration, whereby the yoke 27 connected to the steering shaft through the universal joint 5 is prevented from being vibrated in the circumferential and/or axial directions. As a result, the steering handle arranged at the end of the steering shaft does not vibrate so as to cause discomfort to the driver.

If the angular displacement of the yoke around its axis is small, the coupling member 3 absorbs the angular displacement amount, as a play, due to the elastic deformation thereof. The relative angular displacements of the flange 24 and the yoke 27 are limited by engagement between the first and second sleeves 18, 20 and notches 19, 21 formed in the first and second hold-down plates 8, 15.

If the shaft 22 is subjected to an axial (left and right direction in FIGS. 1 and 2) impact force upon the collision of the vehicle, the shaft 22 is shifted axially with respect to the flange 24, thus collapsing the resilient connector, whereby the impact force is absorbed.

More particularly, if the resilient connector is subjected to a compressive (rightward in FIGS. 1 and 2) impact force upon the collision of the vehicle, the main portion of ring member 33 situated in the above-mentioned space or cavity is broken from radial portion in hole 32, so that the shaft 22 is shifted axially rearwardly with respect to the cylindrical portion 30 of the flange 24.

Figure 2:
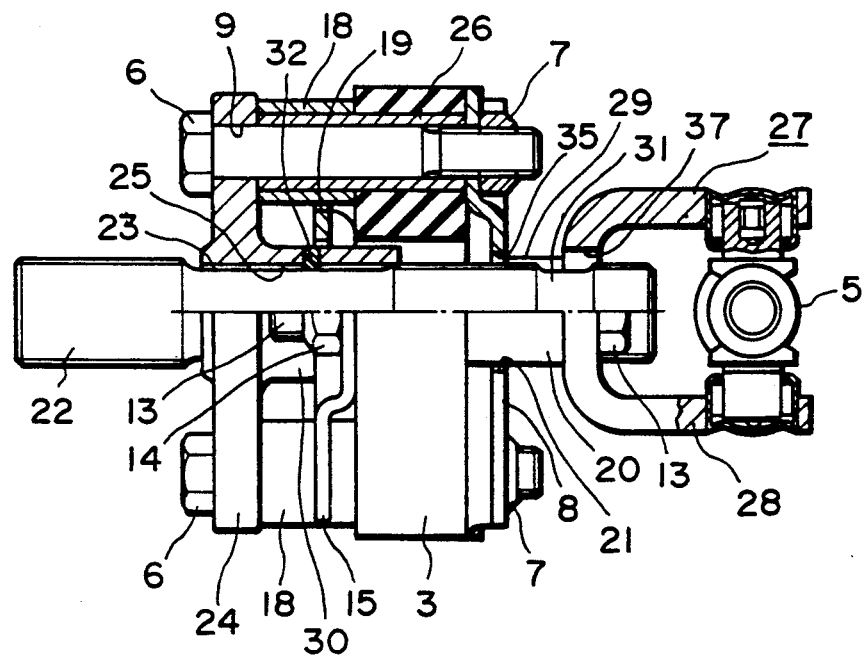
Figure 3:
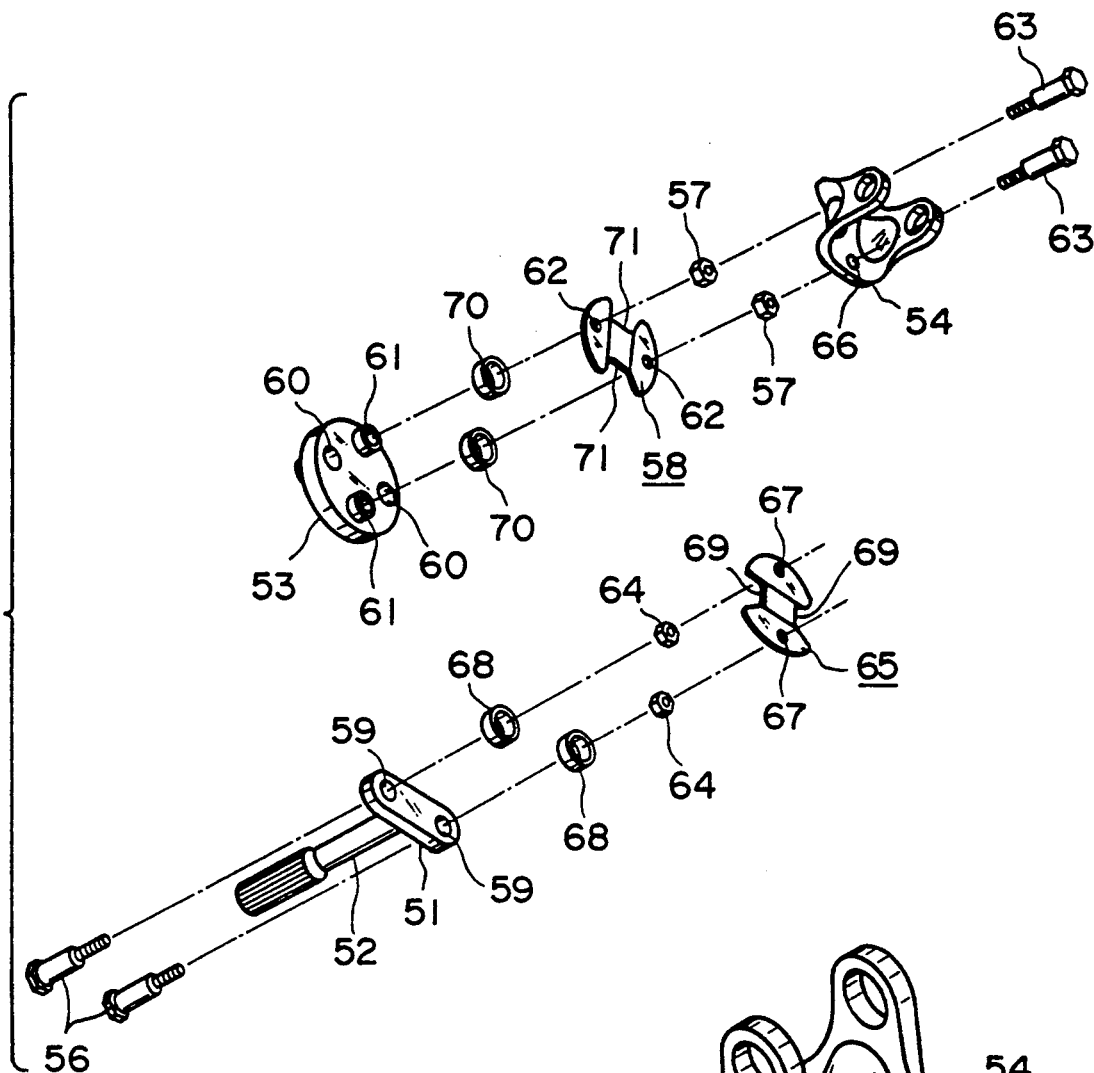
FIGS. 3 and 4 show a conventional resilient connector, where
Figure 4:
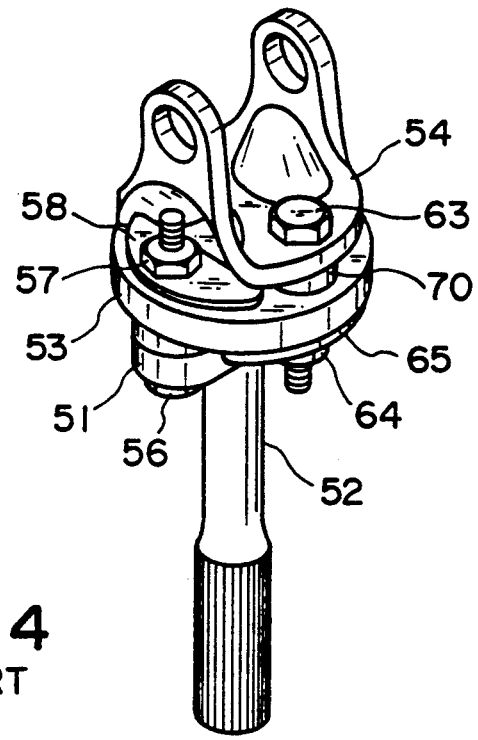

During this shifting movement, the shaft 22 passes successively through the central through hole 34 of the coupling member 3, the central through hole 35 of the first hold-down plate 8 and the central through hole 37 of the yoke 27 to reach the condition shown in FIG. 2. As a result, an adequate displacement distance for the shaft 22, and, thus, an adequate collapsible amount of the resilient connector can be achieved, whereby it is possible to suppress the shock to the driver within the safety limit.

As will be readily appreciated by those skilled in the art, the invention is not limited to the illustrative embodiment, and various modifications are possible in keeping with its broader principles. For example, the cylindrical portion 30 formed on the central portion of the flange 24 and having the serrated bore therein may be formed to face toward the other side of the resilient connector. In this case, the through holes 34, 36 formed in the second hold-down plate 15 and in the coupling member 3 may each have a diameter which permits the passing of the serrated portion 23 of the shaft 22. Further, the cylindrical portion 30 may be formed independently from the flange 24 and assembled therewith.

What is claimed is:

1. A resilient connector for a steering shaft connecting a wheel steering system and a steering wheel, comprising:
    a flange member including a sleeve portion protruding axially to one side thereof, with a first shaft extending from said wheel steering system being axially displaceably but non-rotatably received within said sleeve portion,
    a universal joint yoke through which said first shaft is coupled to a second shaft extending toward said steering wheel, said yoke being disposed to said one side of said flange member such that said sleeve portion protrudes toward said yoke;
    a resilient coupling member interposed between said flange member and said yoke in a direction of an axis of said first shaft;
    first and second connecting means, each including a portion extending through said resilient coupling member, and respectively securing said flange member and said yoke to said resilient coupling member, whereby said yoke and said first shaft are elastically coupled for transmission of rotative force therebetween through said resilient coupling member; and
    means including a breakable body of plastic deposited in a recessed portion of said first shaft and a hole through a periphery of said sleeve portion and holding said first shaft axially fixed within said sleeve portion but allowing axial displacement of said first shaft within said sleeve portion, toward said yoke, in response to a predetermined axial force on said first shaft;
    said resilient coupling member being configured to permit said axial displacement of said first shaft therealong.

2. A resilient connector according to claim 1, wherein said resilient coupling member has an opening aligned with said sleeve portion of said flange member, and through which said first shaft moves when axially displaced as aforesaid.

3. A resilient connector according to claim 2, wherein said yoke has an opening aligned with said sleeve portion and said opening of said resilient coupling member, and through which said first shaft moves when axially displaced as aforesaid.

4. A resilient connector according to claim 3, wherein said first connecting means includes a first hold-down plate disposed at an opposite side of said resilient coupling member from said flange member, and wherein said second connecting means includes a second hold-down plate disposed at an opposite side of said resilient coupling member from said yoke.

5. A resilient connector according to claim 4, wherein said first and second hold-down plates have respective openings in alignment with said sleeve portion and the respective openings of said resilient coupling member and said yoke, and through which said first shaft moves when axially displaced as aforesaid.

6. A resilient connector according to claim 4, wherein said first connecting means includes a first sleeve member interposed between said flange member and said resilient coupling member and a second sleeve member interposed between said flange member and said first hold-down plate, and bolt means passing through and securing said flange member, said first and second sleeve members, and said first hold-down plate to said resilient coupling member.

7. A resilient connector according to claim 6, wherein said second connecting means includes a third sleeve member interposed between said yoke and said resilient coupling member, and second bolt means passing through and securing said yoke, said third sleeve member, and said second hold-down plate to said resilient coupling member.

8. A resilient connector according to claim 7, wherein said first and second hold-down plates have respective openings aligned with said sleeve portion and the respective openings of said resilient coupling member and said yoke, and through which said first shaft moves when axially displaced as aforesaid.

9. A resilient connector for a steering shaft connecting a wheel steering system and a steering wheel, comprising:
    a flange member including a sleeve portion protruding axially to one side thereof;
    a first shaft extending from said wheel steering system and received within said sleeve portion in such a manner that it can be shifted axially but not rotated with respect to said flange member;
    a universal joint yoke through which said first shaft is coupled to a second shaft extending toward said steering wheel, said yoke being disposed to said one side of said flange member such that said sleeve portion protrudes toward said yoke;
    a resilient member disposed between said flange member and said yoke in an axial direction of said first shaft;
    a first connecting member extending through said resilient member and connecting said flange member to said resilient member;
    a second connecting member extending through said resilient member and connecting said yoke to said resilient member;

a second connecting member extending through said resilient member and connecting said yoke to said resilient member; and means including a breakable body of plastic deposited in a recessed portion of said first shaft and a hole through a periphery of said sleeve portion and holding said first shaft axially fixed relative to said flange member but allowing axial displacement of said first shaft relative to said flange member, toward said yoke, in response to a predetermined axial force on said first shaft; and wherein said resilient member is configured to permit said axial displacement of said first shaft therealong.

10. A resilient connector for a steering shaft connecting a wheel steering system and a steering wheel, comprising:

a flange member including a sleeve portion protruding axially to one side thereof;

a first shaft extending from said wheel steering system and received within said sleeve portion in such a manner that it can be shifted axially but not rotated with respect to said flange member;

a universal joint yoke through which said first shaft is coupled to a second shaft extending toward said steering wheel, said yoke being disposed to said one side of said flange member such that said sleeve portion protrudes toward said yoke;

a resilient member disposed between said flange member and said yoke in an axial direction of said first shaft;

a first intermediate member disposed between said flange member and said resilient member in said axial direction;

a second intermediate member disposed between said yoke and said resilient member in said axial direction;

first connecting means extending past said first intermediate member and through said resilient member and connecting said flange member to said second intermediate member;

second connecting means extending past said second intermediate member and through said resilient member and connecting said yoke to said first intermediate member; and means including a breakable body of plastic deposited in a recessed portion of said first shaft and a hole through a periphery of said sleeve portion and holding said first shaft axially fixed relative to said flange member but allowing axial displacement of said first shaft relative to said flange member, toward said yoke, in response to a predetermined axial force on said first shaft; and wherein said first intermediate member, said resilient member, and second intermediate member are configured to permit said axial displacement of said first shaft therealong.

* * * * *